March 31, 1936.  A. J. H. BICKFORD  2,035,941
DISPLAY DEVICE
Filed Oct. 12, 1935
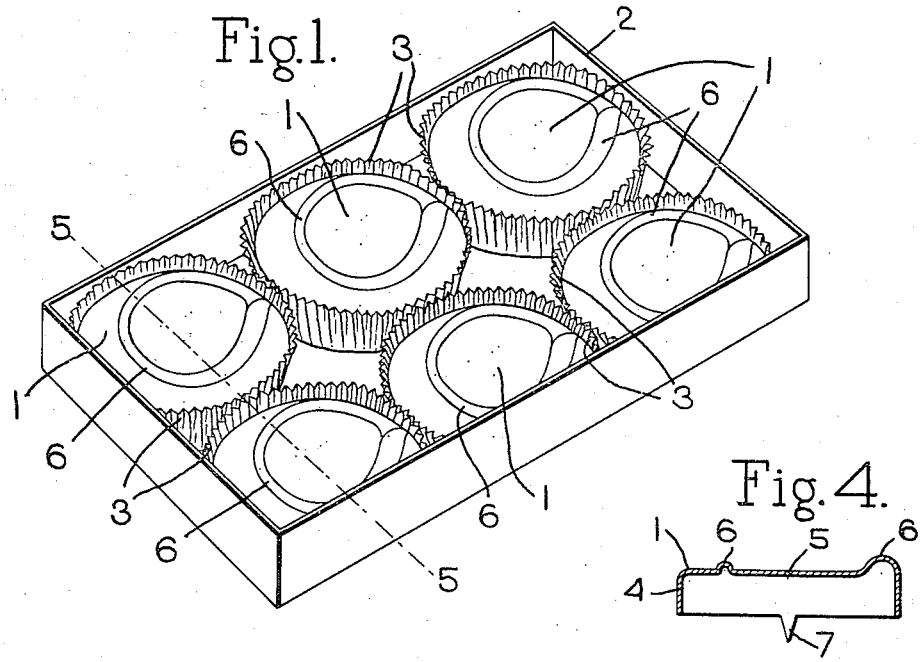
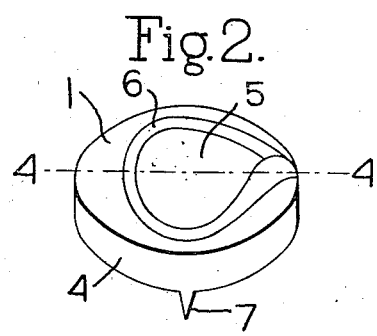
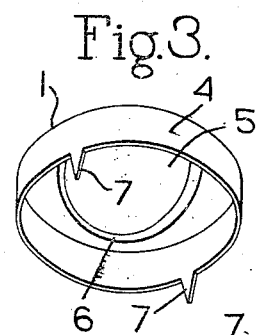
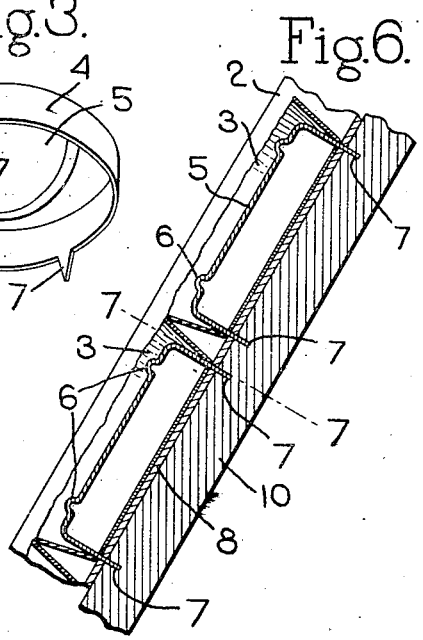
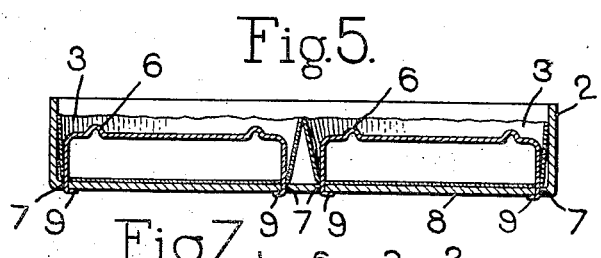
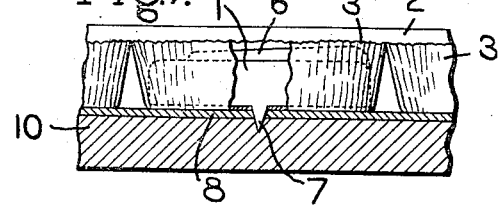
Inventor.
Andrew J. H. Bickford
by Heard Smith & Tennant.
Attys.

Patented Mar. 31, 1936

2,035,941

UNITED STATES PATENT OFFICE 2,035,941

DISPLAY DEVICE

Andrew J. H. Bickford, West Roxbury, Mass., assignor to National Display Co., Malden, Mass., a corporation of Massachusetts Application October 12, 1935, Serial No. 44,759

2 Claims. (Cl. 40—126)

This invention relates to a display device for use in advertising perishable goods, such, for instance, as candy. It is a common custom for the proprietor of a candy store to advertise his wares by opening certain packages of candy and placing them on display in the show window. While this method of advertising is an effective one, yet it has the disadvantage that the box of candy which is thus placed on display is often rendered unfit for sale because of its exposure to dust and dirt or because the temperature in the show window softens the candy sufficiently so that the separate pieces become misshaped or the coating on them begins to run.

It has been proposed to provide dummy packages of candy for display purposes in which the dummy pieces of candy are made of some material which will not be affected by atmospheric conditions or warm weather.

It is an object of my invention to provide improvements in dummy packages of candy in which each dummy piece of candy is made of sheet metal pressed into shape and properly colored so that the exterior thereof simulates in form and color a piece of candy. These dummy pieces of candy are placed in usual fluted paper cups and are assembled in a box. Each dummy piece of candy has a plurality of prongs extending therefrom which project through the paper cup and also through the bottom of the box, said prongs thus serving to retain the pieces of candy and the paper cups in proper position in the box while it is being handled. These prongs may, if desired, be clinched over on the back of the box, thereby holding the dummy piece of candy in proper position during any handling or manipulating of the box. This enables the display package to be set up at an inclination for better display purposes without danger that the individual dummy pieces of candy will slide out of their proper position in the box.

Sometimes it is desirable to place the box against a wooden backing and if this is desired, the prongs of some of the dummy pieces may be pressed into the wooden backing instead of being clinched over on the bottom of the box, thereby securely holding the box and the dummy pieces of candy in place.

In the drawing wherein I have illustrated a selected embodiment of my invention, Fig. 1 is a perspective view of a display package embodying my invention.

Fig. 2 is a perspective view of one of the dummy pieces of candy looking from the top.

Fig. 3 is a perspective view of a dummy piece of candy looking from beneath and showing the attaching prongs.

Fig. 4 is a section on the line 4—4, Fig. 2.

Fig. 5 is a section on the line 5—5, Fig. 1.

Fig. 6 is a fragmentary sectional view showing how the display package may be attached to a wooden backing.

Fig. 7 is a section on the line 7—7, Fig. 6.

The display package herein shown comprises a plurality of dummy pieces of candy 1 which are placed in a box 2, each dummy piece of candy being received in the usual fluted paper cup 3. The dummy pieces of candy 1 are made of sheet metal which is pressed into shape to simulate the shape of some particular piece of candy. As herein shown each dummy piece of candy has a general cup shape and is designed to imitate candy similar to chocolate creams. The dummy piece of candy herein shown is formed with the side wall 4 and the top 5, and the top is formed with a rib 6 of more or less irregular shape and dimension which simulates a rib formed by applying a string-like portion of chocolate or other coating material to the top of pieces of candy as is frequently done. The exterior of each dummy piece of candy will be painted or colored in some suitable way so as to indicate the color of the piece of candy which it simulates, and preferably the finish of each dummy piece will be washable so that the dummy pieces of candy can be washed or cleaned in case they tend to collect dust or dirt while they are exposed for display purposes.

Each dummy piece of candy is made with two spurs or prongs 7 extending from the rim of the cup-like member. When the dummy pieces of candy are assembled in the box 2 each dummy piece will be placed in one of the usual fluted paper cups 3 and then put in position in the box 2, the prongs 7 being passed through the bottom of the fluted cup 3 and also through the bottom 8 of the box 2 as shown in Figs. 5 and 6. If desired, these prongs may be clinched or bent over as indicated at 9, thereby locking the dummy pieces of candy in the box and preventing them from becoming displaced when the box is handled or manipulated.

Sometimes it is desired to display a box of candy by supporting it on or resting it against an inclined wooden support such as shown at 10 in Fig. 6. If it is desired to use my improved display package in this way some of the prongs 7, instead of being clinched over the bottom of the box as indicated at 9, will be pressed into the wooden support 10 as shown in Fig. 6. In both methods of using the invention the prongs of each dummy piece of candy extend through the fluted paper cup in which the dummy is received and through the bottom 8 of the box, and thereby each dummy piece of candy is retained in its proper position in the box whether the box be supported in a horizontal position or placed in an inclined position. In the construction shown in Figs. 1 and 5 the display box is free to be handled and placed in any position and the prongs 7 serve to hold the individual dummy pieces of candy in proper place in the box whatever position the box may assume.

In the construction shown in Fig. 6 the prongs not only hold the dummy pieces of candy in proper position in the box but also serve to hold the box in place on the inclined support 10.

I claim:

1. A display device comprising a box, a plurality of dummy pieces of candy in the box, each dummy piece of candy being made of sheet metal and having a general cup shape with its exterior simulating in shape and color a piece of candy, a fluted paper cup in which each dummy is received, the edge of each cup-shaped dummy having a plurality of prongs extending therefrom and projecting through both the paper cup and the bottom of the box.

2. A display device comprising a box, a plurality of dummy pieces of candy in the box, each dummy piece of candy being made of sheet metal and having a general cup shape with its exterior simulating in shape and color a piece of candy, a fluted paper cup in which each dummy is received, the edge of each cup-shaped dummy having a plurality of prongs extending therefrom and projecting through both the paper cup and the bottom of the box, the portion of the prongs projecting through the bottom of the box being clinched over.

ANDREW J. H. BICKFORD.